(12) United States Patent
Knieper et al.

(10) Patent No.: US 6,238,546 B1
(45) Date of Patent: May 29, 2001

(54) ELECTROCHEMICAL TREATMENT OF EFFLUENT WATER

(76) Inventors: Louis H. Knieper; Gary A. Tipton, both of 1657 Oak Tree, Houston, TX (US) 77080; Daniel G. Noyes, 2044 Bissonnet, Houston, TX (US) 77005

( * ) Notice: Subject to any disclaimer, the term of this patent is extended or adjusted under 35 U.S.C. 154(b) by 0 days.

(21) Appl. No.: 09/284,519

(22) PCT Filed: Oct. 16, 1997

(86) PCT No.: PCT/US97/18657

§ 371 Date: Jul. 23, 1999

§ 102(e) Date: Jul. 23, 1999

(87) PCT Pub. No.: WO98/17589

PCT Pub. Date: Apr. 30, 1998

Related U.S. Application Data

(60) Provisional application No. 60/029,001, filed on Oct. 23, 1996.

(51) Int. Cl.[7] .................................................. C02F 1/461
(52) U.S. Cl. .................. 205/742; 205/759; 205/760; 205/761; 204/269; 204/270; 204/275.1
(58) Field of Search .................................... 205/742, 759, 205/760, 761; 204/269, 270, 275.1

(56) References Cited

U.S. PATENT DOCUMENTS

| 4,036,726 | 7/1977 | Gale et al. . |
|---|---|---|
| 4,329,211 | 5/1982 | Plantes et al. . |

*Primary Examiner*—Arun S. Phasge
(74) *Attorney, Agent, or Firm*—Harrison & Egbert

(57) ABSTRACT

An apparatus (200) for the treatment of effluent including a chamber (210) having an inlet (212) and an outlet (252), a plurality of plate-type electrodes (211) extending vertically in the chamber (210), and an electrical supply connected to the plurality of plate-type electrodes (211). The plurality of plate-type electrodes (211) define a plurality of channels extending within the chamber (210). Each of the plurality of channels occurs between adjacent electrodes (211). The plurality of electrodes (211) are positioned between the inlet (212) and the outlet (252). The electrical supply delivers electricity of a first polarity to a first set of a plurality of electrodes (211). The electrical supply delivers electricity of an opposite polarity to the second set of electrodes (211).

16 Claims, 9 Drawing Sheets

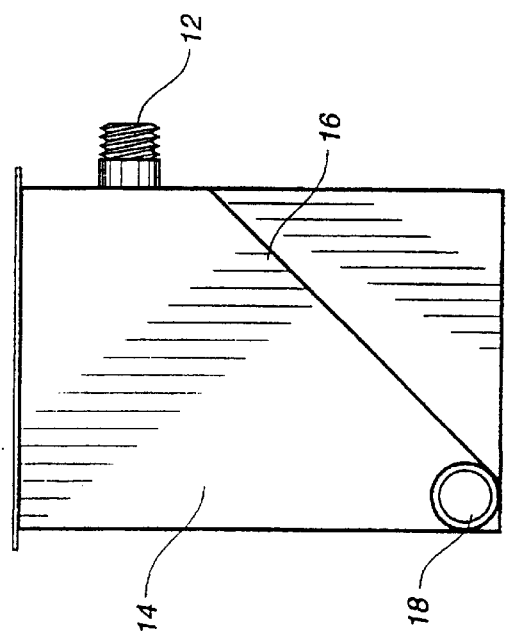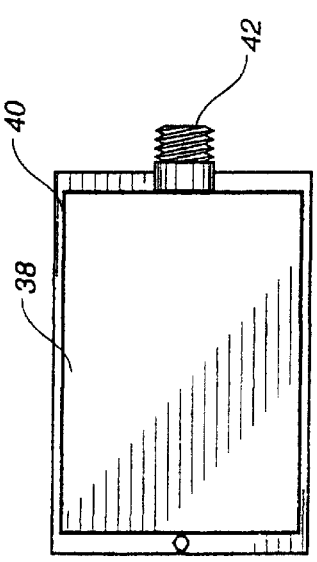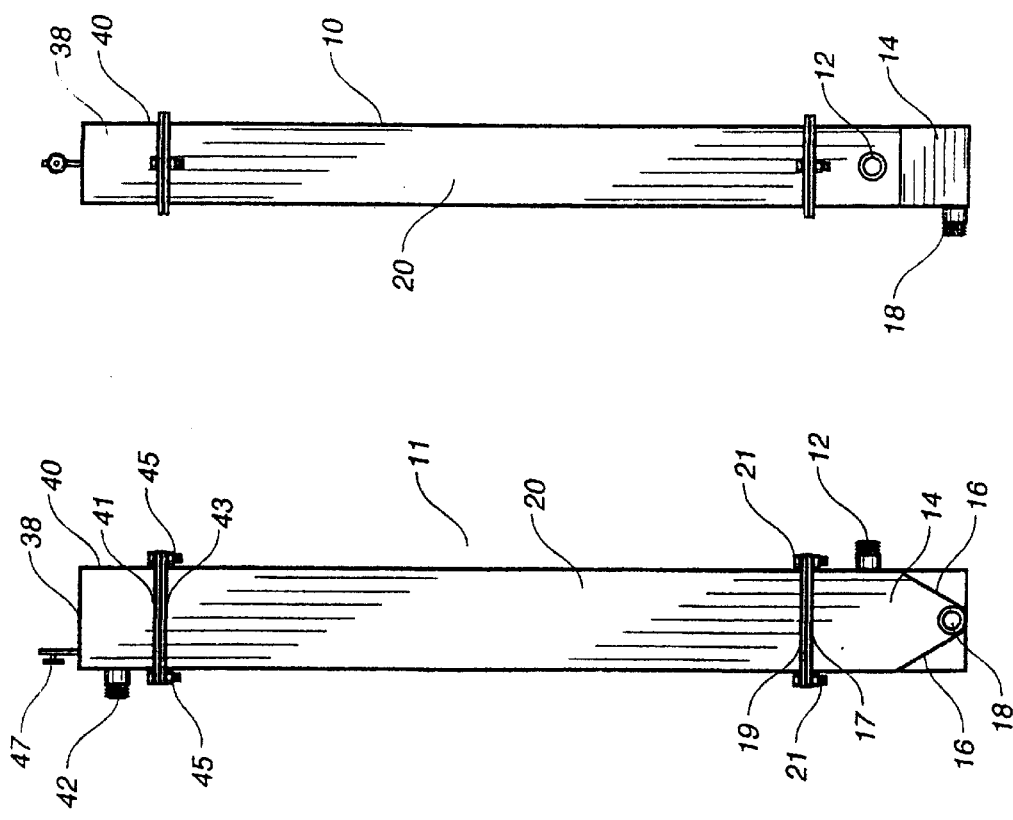

US 6,238,546 B1

ELECTROCHEMICAL TREATMENT OF EFFLUENT WATER

This application is a 371 of PCT/US97/18657 filed Oct. 6, 1992 which claims priority of provisional Application No. 60/029,001 filed Oct. 23, 1996.

TECHNICAL FIELD

The invention relates to the electrochemical treatment of effluent water to remove suspended solids and dissolved particles and provide discharge water within environmental requirements. The invention includes design of an electrochemical cell suitable for such treatment.

BACKGROUND ART

A wide variety of chemical and mechanical processes have been developed in an effort to control pollution from effluent streams in various industries. Impurities in the streams include suspended solids and dissolved particles. Both chemical and mechanical methods have been employed to cause the impurities to coalesce to permit removal by filters, centrifuges, separators, and clarifiers. The goal of the processes is to remove sufficient impurities to allow the effluent liquid to be discharged into the environment with an acceptable amount of adverse impact.

Efforts to treat water by use of electricity to coalesce and remove impurities have existed for many years. One such effort is disclosed in U.S. Pat. No. 5,271,814 which issued to David M. A. Metzler, on Mar. 19, 1992.

Past efforts to achieve coalescence of contaminants in effluent streams without the use of added chemicals have met with some success, but have also had problems with efficiency, cost, flexibility and disposal of the coalesced materials. In addition, many systems require batch processing rather than continuous processing. Accordingly, there is a need for a novel system which can remove impurities from effluent streams and can operate as a continuous process.

SUMMARY OF THE INVENTION

Water with dissolved, suspended, or disbursed contamination is introduced into a treatment cell which contains a plurality of plate-type electrodes forming long narrow channels in a chamber through which the contaminated water must flow. Alternate electrodes may have surface irregularities, such as slight corrugations, running perpendicular to the direction of water flow. Such irregularities disrupt laminar flow of the liquid and permit an electron flux to concentrate along the ridges nearest the adjacent plates for increased intensity of electron flow. Such irregularities are preferred for treatment of an effluent with high amounts of contamination. The water moves perpendicular to the flow of electricity. Water flow and electron flow (amperage) are kept constant for a given application. Voltage is allowed to fluctuate based on the instantaneous conductivity of the water. This input of energy to the contaminated water causes a number of physical and chemical reactions to take place which destabilize the contaminated water and cause the contaminants to change form to aid in their removal from the water.

BRIEF DESCRIPTION OF -THE DRAWINGS

FIG. 1 is a front elevational view of a treatment cell in accordance with the invention.

FIG. 2 is a side elevational view of the treatment cell shown in FIG. 1.

FIG. 3 is an alternative form of the entry chamber shown at the bottom of FIG. 1.

FIG. 4 is a top view of the outlet chamber shown at the top of FIG. 1.

DETAILED DESCRIPTION OF THE INVENTION

Figure 5:
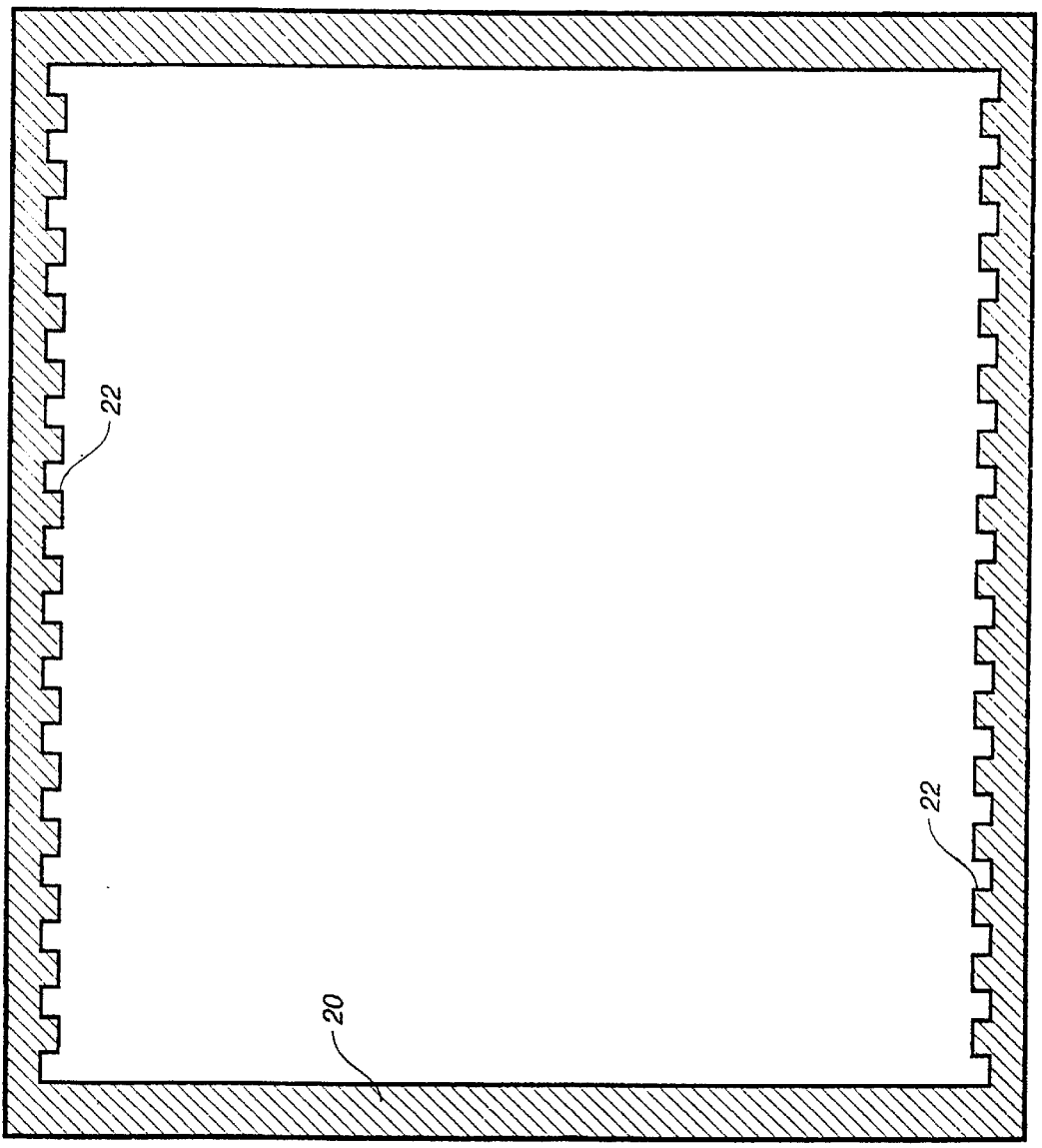
FIG. 5 is a sectional view taken through the treatment chamber of FIG. 1.

With reference to FIGS. 1 and 2, water with dissolved, suspended, or dispersed contamination is introduced into treatment cell 10 of chamber 11 at a constant flow rate through an entry 12 at the bottom of the chamber 11. Prior to entry, pH of the water for treatment may need to be adjusted to attain the desired treating reactions and changes in form. A pH between 4 and 9 is generally preferable although a pH commonly used is about 5. At a pH of about 5, H+ and OH– radicals can be generated with relative ease. The temperature of the effluent should also be controlled either before or after treatment to a range between about 40° F. and 180° F. Outside of this temperature range flocculation is more difficult.

The entry 12 may be a pipe, opening, orifice, nozzle, valve, or other device as suits the application of the technology. The contaminated water enters an entry chamber 14 that functions to reduce velocity and to distribute the flow across the rectangular cross section of the treatment section 20 of the chamber 11. The dimensions of the entry chamber 14 are critical for its function and limit the flow rate to a minimum of 20 gallons per minute and a maximum of 30 gallons per minute. The bottom of entry chamber 14 has a taper 16 to an outlet 18 that is operated by an external valve. Solids and sludges separated in the chamber 14 are collected and directed to the external valve for periodic removal by this design. FIG. 1 and FIG. 3 show configurations of the tapered section 16. An angle of about 60° has been found suitable for the tapered section 16.

Figure 6:
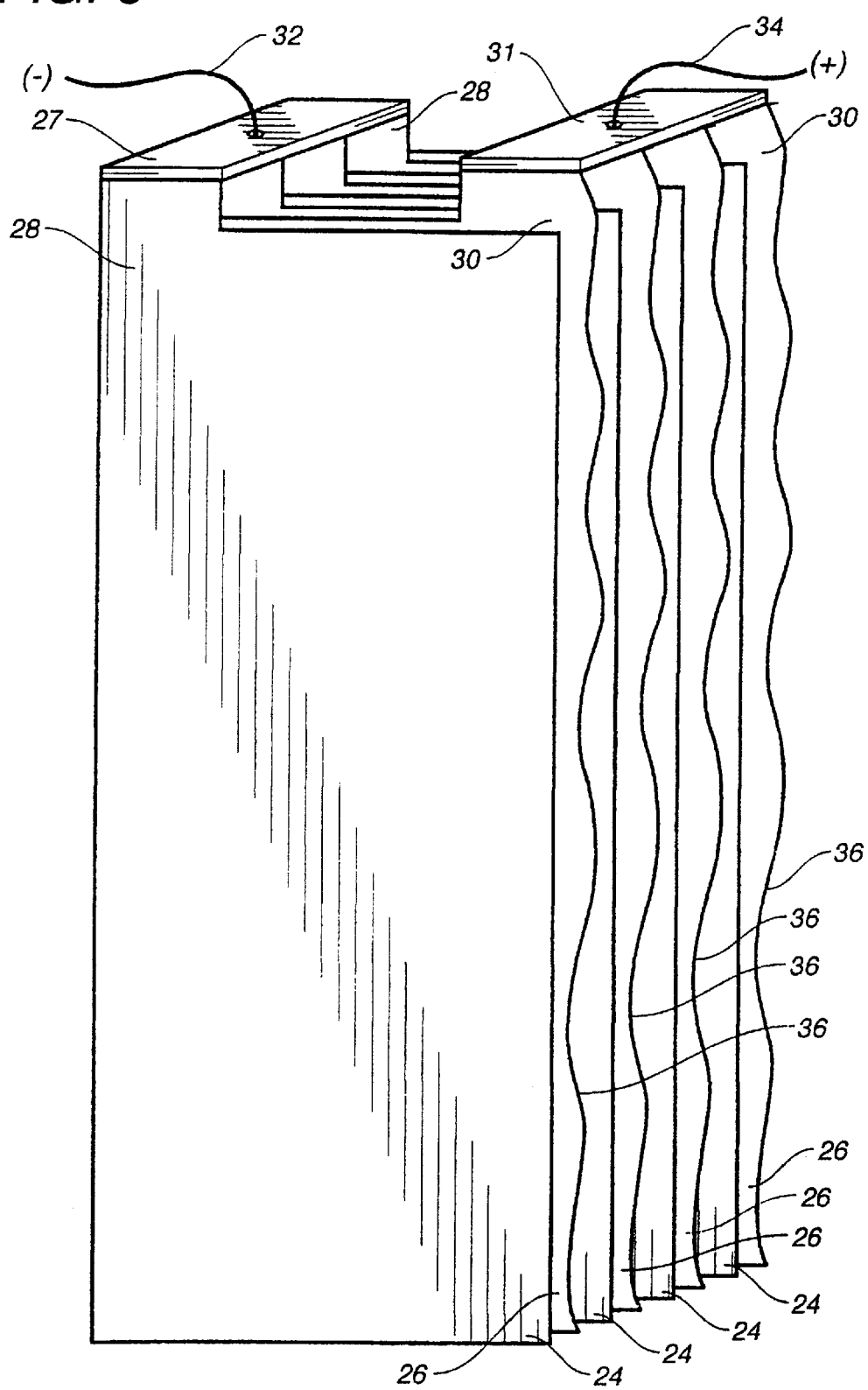
FIG. 6 is an exploded view of the electrode plates which fit in the treatment cell of FIG. 1.

Water conditioned in the entry chamber 14 is caused to flow upward into the treatment section 20 of the chamber 11. This treatment section 20 is about four feet long with internal dimensions of about thirty-two square inches. These dimensions are proportionalities and cannot be independently altered, but other dimensions can be employed. The surface area of the plates and the flow rate past them must be balanced to achieve the desired amount of destabilization prior to subsequent coagulation. The treatment section 20 may be either round or rectangular tube constructed of a nonconductive, rigid material such as fiberglass, PVC, or stainless steel with a non-conductive liner or coating. Opposite long sides contain grooves 22 (as shown in FIG. 5) for the length of the section 20 to form an electrode rack. These parallel grooves 22 hold plate-type electrodes 24 and 26 (as shown in FIG. 6) forming long thin channels between the electrodes through which the contaminated water must flow. With the integral support rack or structure having the opposite surfaces with parallel grooves, electrodes can be readily removed and replaced to facilitate exchange or cleaning. Electrochemical treatment occurs in the long thin channels between the plates. Flow rates through a single cell 10 depend on size but generally are between about 20 and about 30 gallons per minute, preferably 25 gallons per minute, for a cell with a cross-sectional area of 30–60 square inches.

The top inside dimensions of the entry chamber are designed smaller than the width of electrodes 24 and 26 to support the electrodes within the treatment section 20. Other suitable supports could also be used. The entry chamber 14 has a peripheral flange 17 which is held together by bolts 21 to a peripheral flange 19 on the outer bottom surface of the treatment section 20. A gasket may be used to seal between the flanges 17 and 19.

A stable, controlled direct electrical current (DC) is introduced to the treatment section through the electrodes. Flat plate electrodes 24 are physically connected across the top by welding or electrically connecting a strap 27 of similar material across a projection 28 on one end of the row of plates 24. Corrugated plate electrodes 26 are welded or electrically connected across projections 30 on the other side to a similar strap. These straps 27 and 31 are connected to electrical wires 32 and 34 and serve as electron flow distribution units to distribute the electrical current to and from the plate electrodes 24 and 26. An extension from each connecting strap 27 and 31 may extend through the external shell of the section to allow outside dry contact with the electrical power. Alternating electrodes 26 have an irregular surface caused by slight corrugations running perpendicular to the water flow. These corrugations are preferably sinusoidal in shape. These corrugations 36 may be created by alternately deflecting the plate back and forth to form furrows or ridges. Although the deflections are slight, they achieve two purposes critical to successful treatment. The perpendicular corrugations 26 disrupt laminar flow which allows for complete contact and treatment. The corrugations 26 also concentrate the electron flux along the ridges for increased intensity of discharge. Electrode plates of opposite polarity are very close together along each corrugation. The electrode plates are 5/16" and 13/16" between the centerlines and each plate is 1/8" to 1/4" thick.

Within each chamber formed by the electrodes and cell walls of the treatment section 20, the flow of water moves perpendicular to the flow of electricity in a counter current fashion, i.e., water enters the bottom and electricity enters the top. Water flow and electron flow (amperage) are kept constant for a given application. Voltage is allowed to fluctuate based on the instantaneous conductivity of the water. This input of energy to the contaminated water causes a number of physical and chemical reactions to take place which destabilize the contaminated water. Voltage and current are adjustable to select the best flow for a specific waste stream. Voltages are generally maintained between about 5 and about 30 volts with current flow across a cell being maintained between about 20 and about 60 amps, assuming cells of a size described above. An individual cell normally contains about 14 to 16 alternating electrodes within an electrode rack about 6¾" across. Voltage and current can be controlled with conventional electric controllers, such as rheostats and rectifiers.

The current between electrodes should be direct current in one direction, although a square wave voltage may be employed for some applications. The polarity between the electrodes should be reversed periodically, e.g., between one and five minutes to avoid electrochemical plating. In general, systems with metal ions in the effluent require faster reversal of polarity to avoid plating. The current should be in one direction as long as possible but shorter than the time for plating to be significant. Under load, a mercury vapor switch with a minimum life of 3,000,000 cycles is preferred for the current flow involved.

An alternative to switching with mercury vapor switches is with a center tap transformer and a SCR bridge rectifier. One pair of SCR diodes are turned off during a switching cycle. This combined with the center tapped transformer will allow solid-state switching.

To minimize side lobes and spiking associated with abrupt changes in the current flow, the AC current is ramped down prior to switching and ramped back up after the switching. A second dampening transformer is used to further minimize spiking. The second transformer acts as a surge suppressor by providing a counter flow current during the switching operation.

A blending and equalization chamber 38 is formed by a cap 40 at the top of the cell 10 (as shown in FIG. 4). Cap 40 has a peripheral flange 41 which is held against a peripheral flange 43 around the top of the treatment chamber 20 by bolts 45. A gasket may be used to seal between the flanges 41 and 43. Blending chamber 38 receives water as it leaves the treatment section 20 of the cell 10 in a vertical direction. In this chamber 38, gases from the electrical treatment may be captured and vented from the vertical flow. Gases are derived from carbonates, nitrogenous compounds, halogenated compounds, chlorides, and hydrolysis of the water. Usually these are released in small amounts in this chamber 38. The chamber 38 also serves to equalize pressure within the system and minimize the swelling effect caused by the electrical treatment. A valve 47, such as a check valve, may be located on the cap 40 to allow gases to escape.

Treated and destabilized water is transported through treated water outlet 42 from the chamber 11 to a manifold (not shown) that collects effluent from a plurality of cells and conveys the treated water to a holding tank for coalescence where the destabilized water is allowed to attain a modified equilibrium. The contaminants coalesce and agglomerate around charged nuclei and create either globules or floc. The imbalance continues to cause reaction and even delayed redox reactions may occur in the coalescence tank of the system. Through natural mechanisms, globules in the water will continue to coalesce and will form a discrete layer of immiscible liquid that will rise to the top or sink to the bottom based on its density. Flock particles agglomerate until the charged and imbalanced system has come to equilibrium. The floc sinks or floats based on the density of the contaminate.

As the water leaves the coalescence tank, it has been treated and impurities have been removed. Floating scum and settled sludge will contain impurities which may be removed by conventional means and disposed of appropriately.

The most direct result of the treatment on contaminants is the disruption of the Stern's layer of charges that keep suspended particles apart and dispersed throughout the water. Colloids and minute particles can then attach to each other reaching a critical mass for separation. In addition, some particles may have an induced static charge that causes them to be attracted to opposite charged particles. Along similar lines, the polar water molecules may be affected by the electric field causing a new alignment that reduces affinity for suspended materials. The new system is effective for both hydrophilic and hydrophobic suspensions.

A second result of the electrical current in the contaminated water is the alteration of the molecules and atoms due to the presence of the electrons. Reduction occurs at the cathode causing some materials to become less soluble or to achieve a neutral valence state. At the anode, oxidation may occur due to the stripping of electrons. In addition, at the anode, metal ions may be released leading to complexing and floc nuclei formation. Certain elements and compounds that exist as relatively stable ionic species may be crated by substitution or stripping in the electronic field (chlorine stripping of chlorinated hydrocarbons).

In addition to the alterations of the redox equilibrium within the treatment cell, hydrolysis is also taking place. Hydrogen, oxygen, and hydroxyl liquids are generated from the breakdown of water molecules at the electrodes. These are available to attack the contaminates in the water flow as they are created and swept away from the electrodes. The result is a reduction in COD and BOD values in the treated effluent.

Lastly, the flow of electrons through the contaminated water kills organisms. Bacteria, protista, fungi, spores and parasites are destroyed due to the alteration of the cell membrane function by the presence of an abundance of negative charges. Unstabilized membrane potentials allow the cells to rupture or to desiccate due to osmotic imbalances. The data to date indicates that disinfection has been demonstrated.

The material of construction of the electrodes 24 and 26 is constant in each cell but may vary between cells and from application to application. Electrodes are commonly made from cast iron, mild steel, carbon steel, or hardened aluminum. 401 aluminum alloy has been successful. Less typically but for specific treatment purposes, electrodes may be lead, titanium, platinum, graphite, copper, etc. Electrode pairs which have been used successfully include iron and aluminum, lead and aluminum, and titanium and aluminum. Graphite bonded with epoxy may also be used. Electrode materials should be selected depending on the characteristics of a particular waste system.

Additional energy may be introduced to the treatment portion of the cell in the form of ultrasonic oscillations within the medium to be treated. Ultrasound is applied along with the electric current to further degrade atomic and inter-molecular bonds, to increase the efficiency of oxidation resulting from hydrolysis, to keep materials in suspension, to keep cells clean, and to aid in preventing degradation of the electrodes. The power generator may be external to the system but the preferred method is to attach a unit to each cell.

Figure 7:
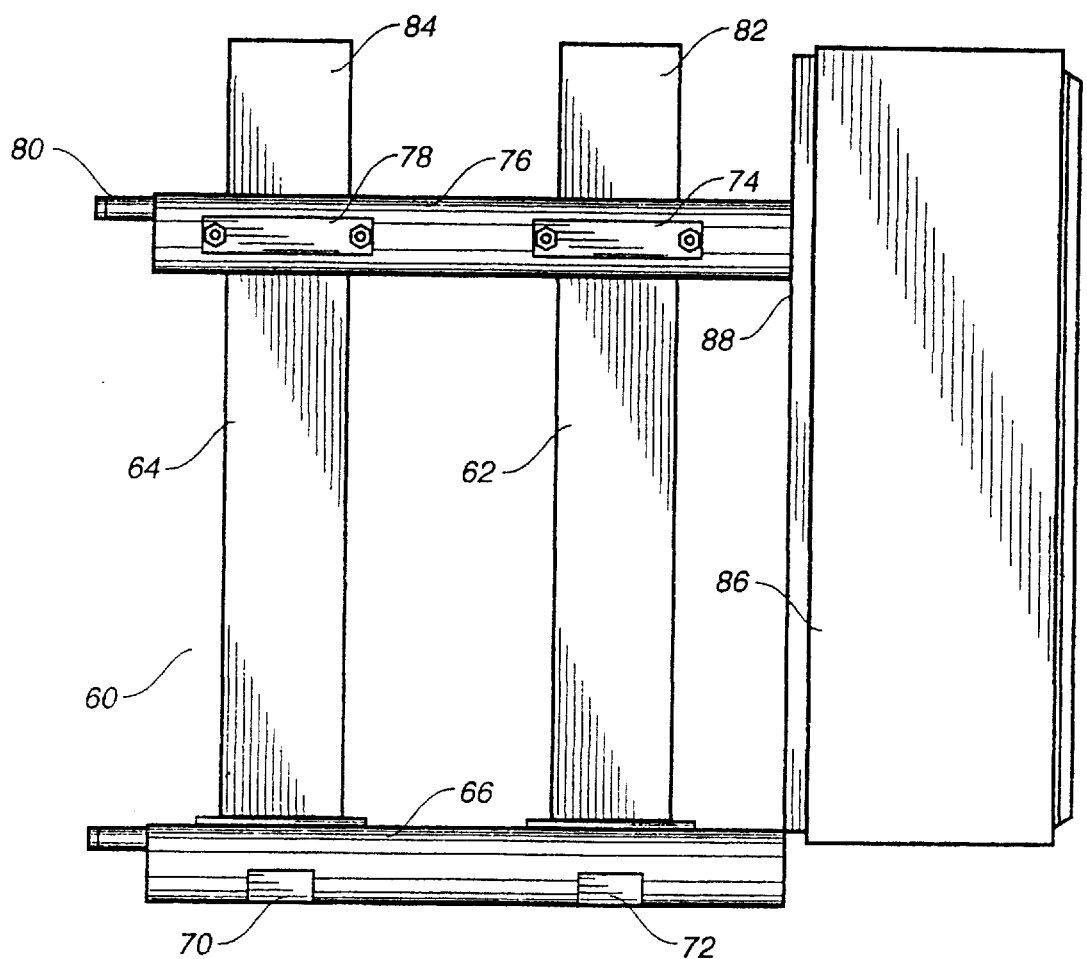
FIG. 7 is a side view of treatment cells in accordance with the invention.
Figure 8:
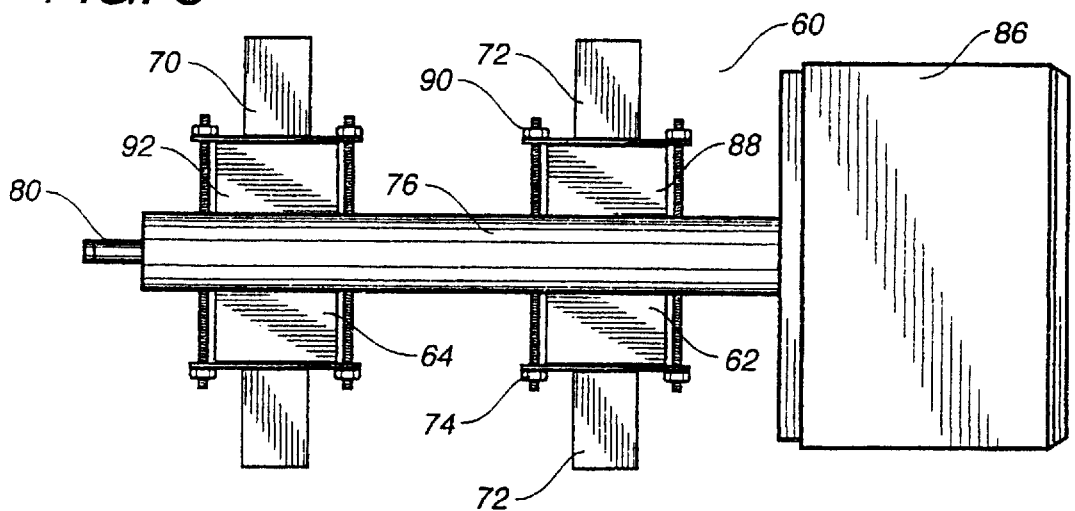
FIG. 8 is a top view of the cells shown in FIG. 7.
Figure 9:
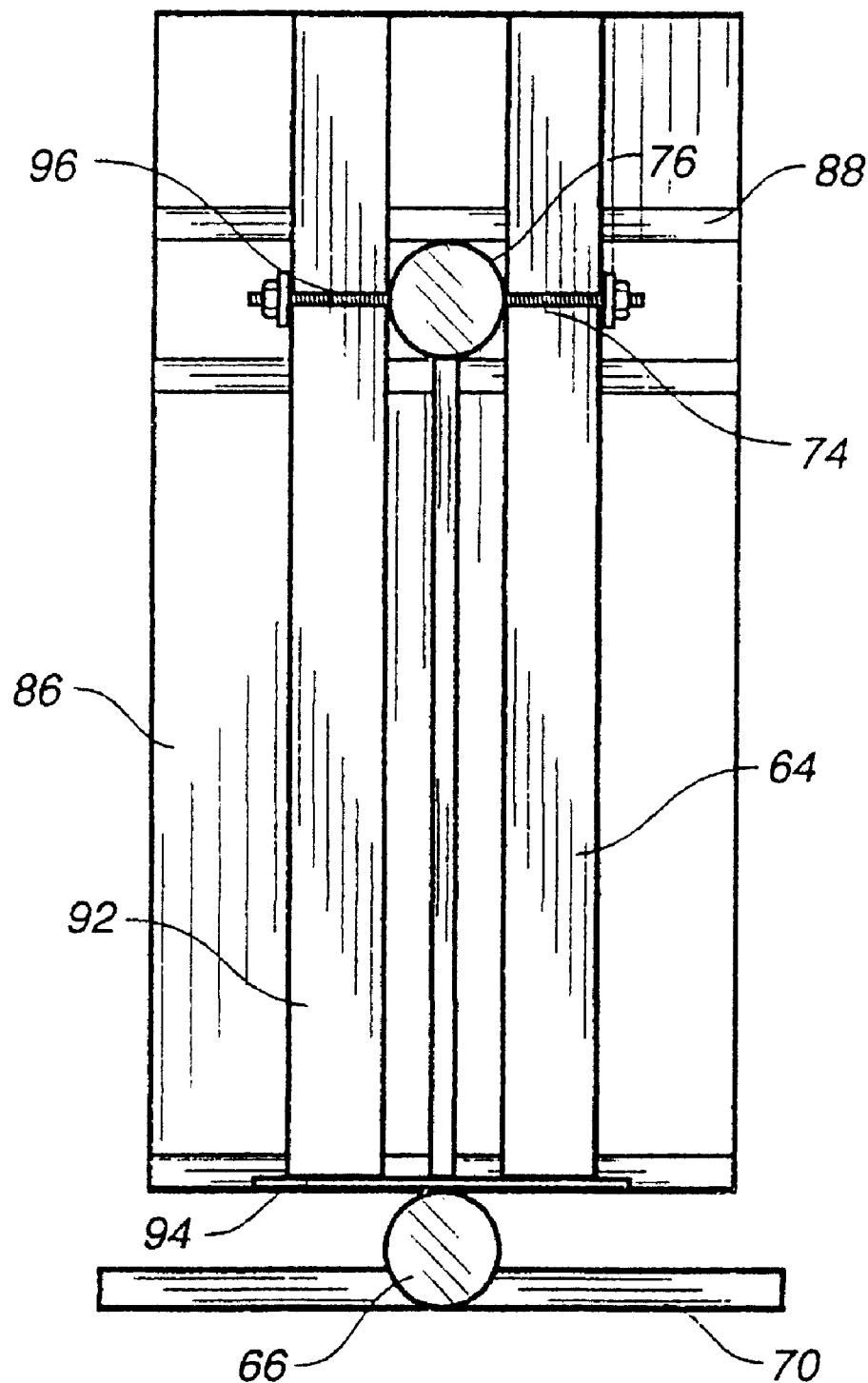
FIG. 9 is an end view of the cells shown in FIG. 7.

FIGS. 7–9 show the system of the present invention in which each of the treatment chambers can be arranged in combination so as to effect the systematic treatment of a large volume of the effluent. System 60 is shown in FIG. 7. System 60 includes treatment chamber 62 and treatment chamber 64 supported on a manifold 66. As can be seen, the inlet 68 serves to deliver the untreated effluent into the manifold 66. Feet 70 and 72 extend transversely outwardly from the manifold 66 so as to support the system 60 on a floor. The treatment chamber 62 extends vertically upwardly from the manifold 66. A bracket 74 affixes the treatment chamber 62 to an outlet manifold 76. Similarly, a bracket 78 is used so as to support the treatment chamber 64 to manifold 76. Outlet pipe 80 serves to pass the treated effluent outwardly of the system 60 to a coalescence tank. It can be seen that the treatment chamber 62 has a blending and equalization chamber 82 positioned thereabove. Similarly, the treatment chamber 64 has a blending and equalization chamber 84 affixed thereabove. Each of these chambers 82 and 84 will have suitable gas release means formed thereon. Power supply 86 is connected by bracket 88 to the manifold 76. The power supply 86 provides the necessary electrical energy to the respective plate-type electrodes within the treatment chambers 62 and 64.

FIG. 8 is a plan view of the system 60 of FIG. 7. As can be seen, the outlet manifold 76 extends centrally between the treatment chamber 62 and an adjacent treatment chamber 88. The chambers 62 and 88 are held by bracket 74 and 90, respectively, to the manifold 76. It can be seen that feet 72 extend outwardly at the base of the system 60. The power supply 86 is connected to the outlet manifold 76 so as to deliver suitable electrical energy.

In FIG. 8, it can also be seen that another pair of treatment chambers 64 and 92 are affixed to the outlet manifold 76 at a location laterally displaced from the treatment chambers 62 and 88. It can be seen that the feet 70 extend outwardly so as to support the chambers 64 and 92 on the ground. The outlet pipe 80 extends from the outlet manifold 76 so as to deliver the treated effluent to the coalescence tank.

FIG. 9 shows an end view of the system 60. In particular, it can be seen that feet 70 serve to support the inlet manifold 66 above the ground. The chambers 64 and 92 are fluidically connected to the inlet manifold 66. A suitable support 94 is used so as to properly position the chambers 64 and 92 in their respective locations relative to the manifold 66 and 76. The power supply 86 is shown as extending rearwardly of the chambers 64 and 92.

In FIG. 9, it can be seen that the bracket 94 serves to secure the treatment chamber 64 to the outlet manifold 76. Similarly, bracket 96 is used to secure the treatment chamber 92 to the outlet manifold 76. Bracket 88 secures the power supply 86 to the treatment units.

Figure 10:
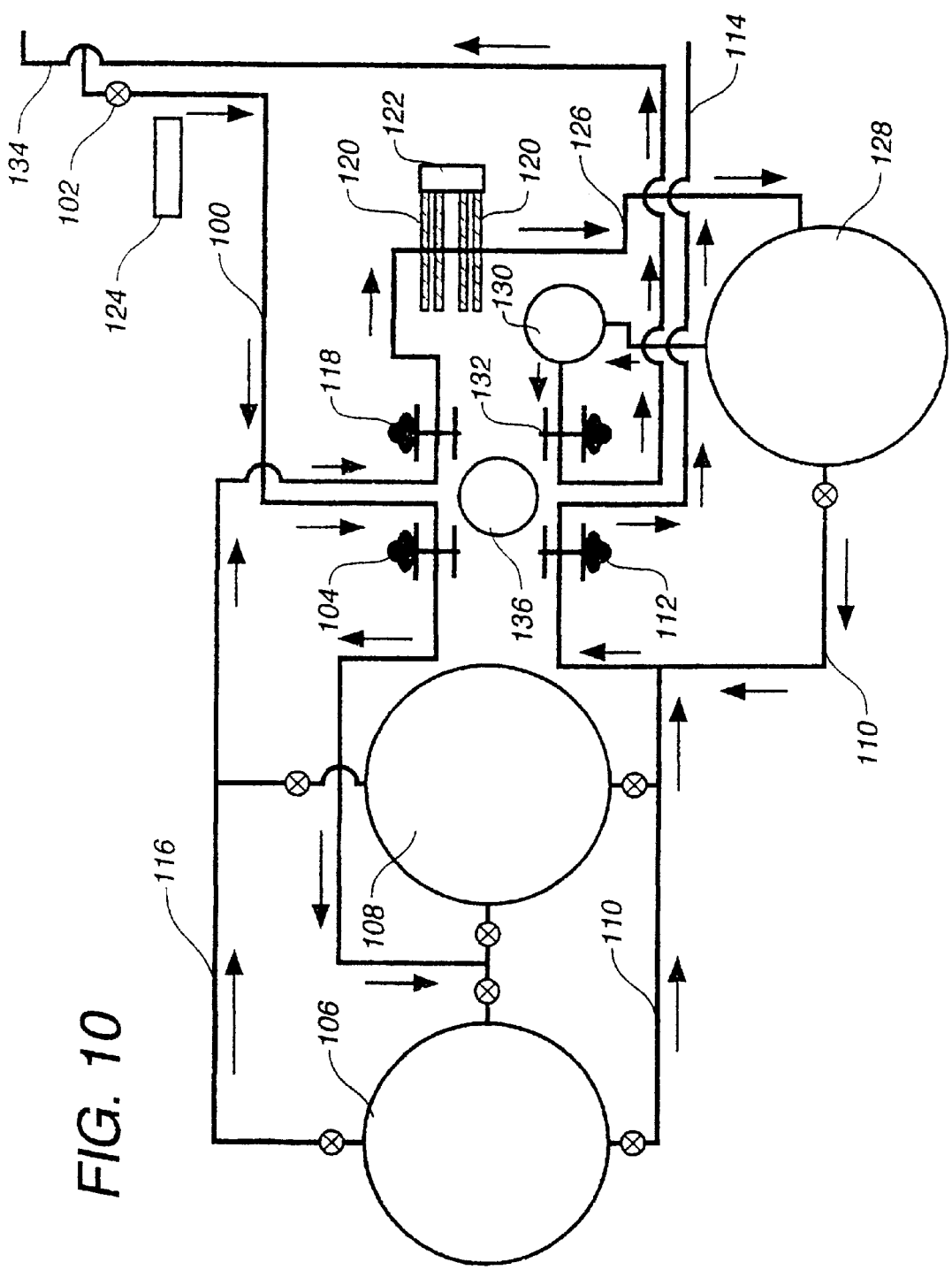
FIG. 10 is a schematic drawing of a process utilizing the electrochemical treatment cells in accordance with the invention.

With reference to FIG. 10, a process for treating contaminated effluent 100 from an industrial plant is illustrated. Effluent 100 passes through valve 102 to a positive displacement air operated pump 104 and into the inlets of two tanks 106 and 108 where the effluent 100 is allowed to separate and form a sludge at the bottom of the tanks 106 and 108. Sludge 110 passes from the tanks 106 and 108 to a pump 112 and then is pumped to sludge outlet 114 for appropriate disposal. Contaminated water 116 exits the top of the two tanks 106 and 108 and proceeds to positive displacement pump 118 where it is pumped into the appropriate number of electrocoagulation units 120 for treatment. Electrocoagulation units 120 are controlled by the electrocoagulation unit panel 122 which is further controlled by the electrocoagulation box 124. The electrocoagulation units 120 are illustrated in series, but the units may be used in parallel or in a combination of series and parallel to achieve the desired results.

Treated water 126 then passes to a holding tank 128 for coalescence and separation after treatment by the electrocoagulation units 120. Sludge 110 from the bottom of tank 128 is directed to positive displacement pump 112 for disposal through discharge 114.

Treated water is taken from the holding tank 128 through a suitable filter 130 and then through a positive displacement pump 132 where it is pumped to a discharge 134.

The four positive displacement pumps 104, 112, 118 and 132 are controlled by an air supply 136. The pumps are controlled to provide a continuous process and to balance the system while regulating flow through the electrocoagulation units. The units are controlled to balance the input to the electrocoagulation units with the liquid output from the holding tank. The contaminated effluent 100 is matched with the sludge discharge and the treated effluent 134 to provide a continuous balanced system. The system could be balanced in other ways but a combination of positive displacement pumps is durable and inexpensive. Filter 130 can be a filter bag canister or other suitable filter such as a belt filter. A plurality of filters may also be employed to allow for cleaning and removal of filter cake without closing the continuous process. Preferably, the filters should be capable of removing solids 150 microns in size to about 0.01 microns for particular requirements.

Figure 11:
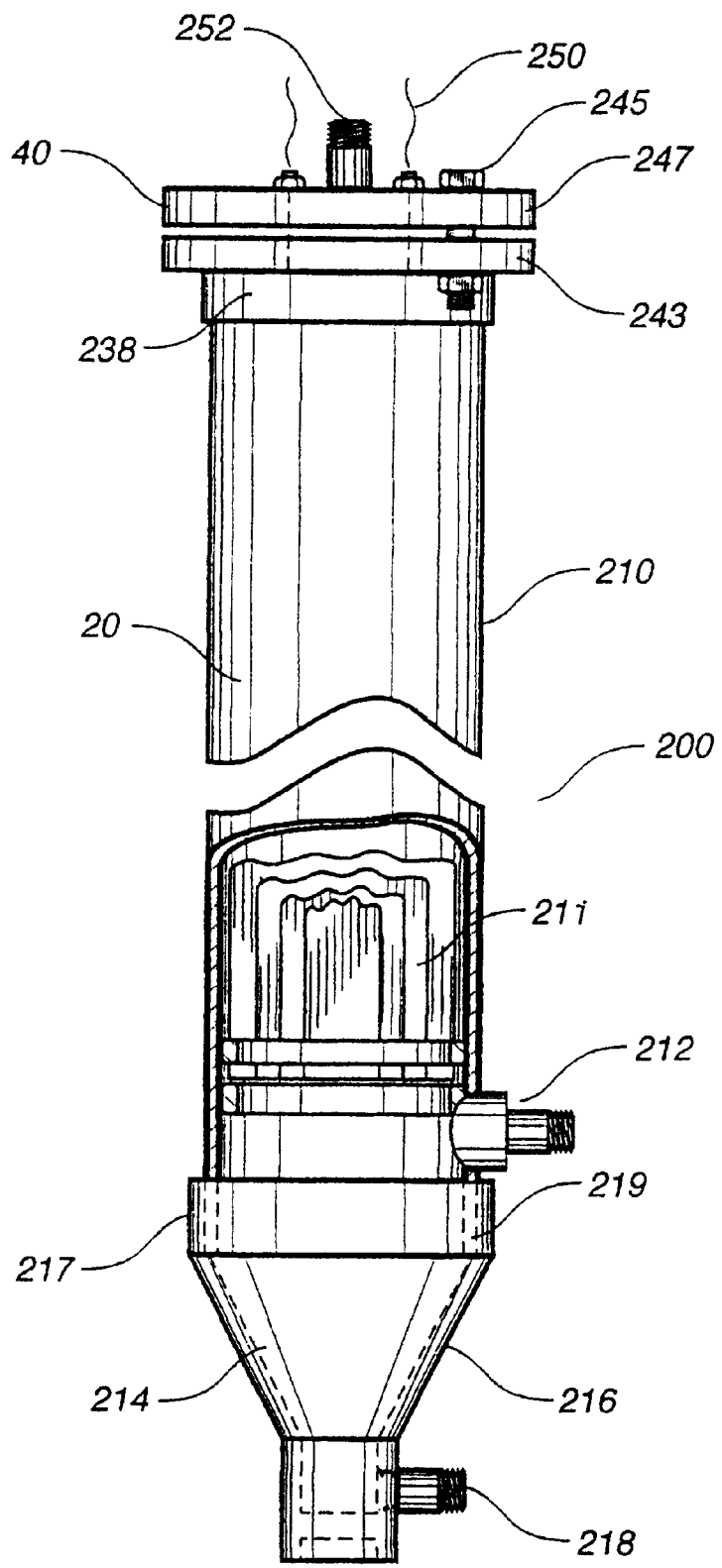
FIG. 11 is a frontal partially cross-sectional view of an alternative embodiment of the treatment cell in accordance with the present invention.

FIG. 11 shows an alternative embodiment of the system 200 for the treatment of effluent water. System 200 includes a treatment chamber 210 of a generally cylindrical configuration which extends vertically. A plurality of plate-type electrodes 211 are installed on the interior of treatment chamber 210 in the arrangement described herein previously. Inlet chamber 216 is shown as having a tapered section 216 extending downwardly to solids removal opening 218. The solids removal opening 218 allows for the removal of solids and sludges from the interior of the treatment chamber 200. In the embodiment shown in FIG. 11, since the chamber 214 and the chamber 210 are of generally cylindrical configuration, a collar 217 is used to secure the treatment chamber 210 to the entry chamber 216. A neck 219 extends downwardly into collar 217 so that a solid fit can occur therebetween. Inlet opening 212 is formed so as to allow for the introduction of effluent water into the interior of the treatment chamber 210. The blending and equalization chamber 238 is affixed to the top of the treatment chamber 210. This chamber 238 is secured through the use of peripheral flange 241 which is secured to the flange 243 through the use of bolts 245. A gas vent 250 extends upwardly from the chamber 238. A pipe 252 allows for the passage of treated effluent into the chamber 238.

Figure 12:
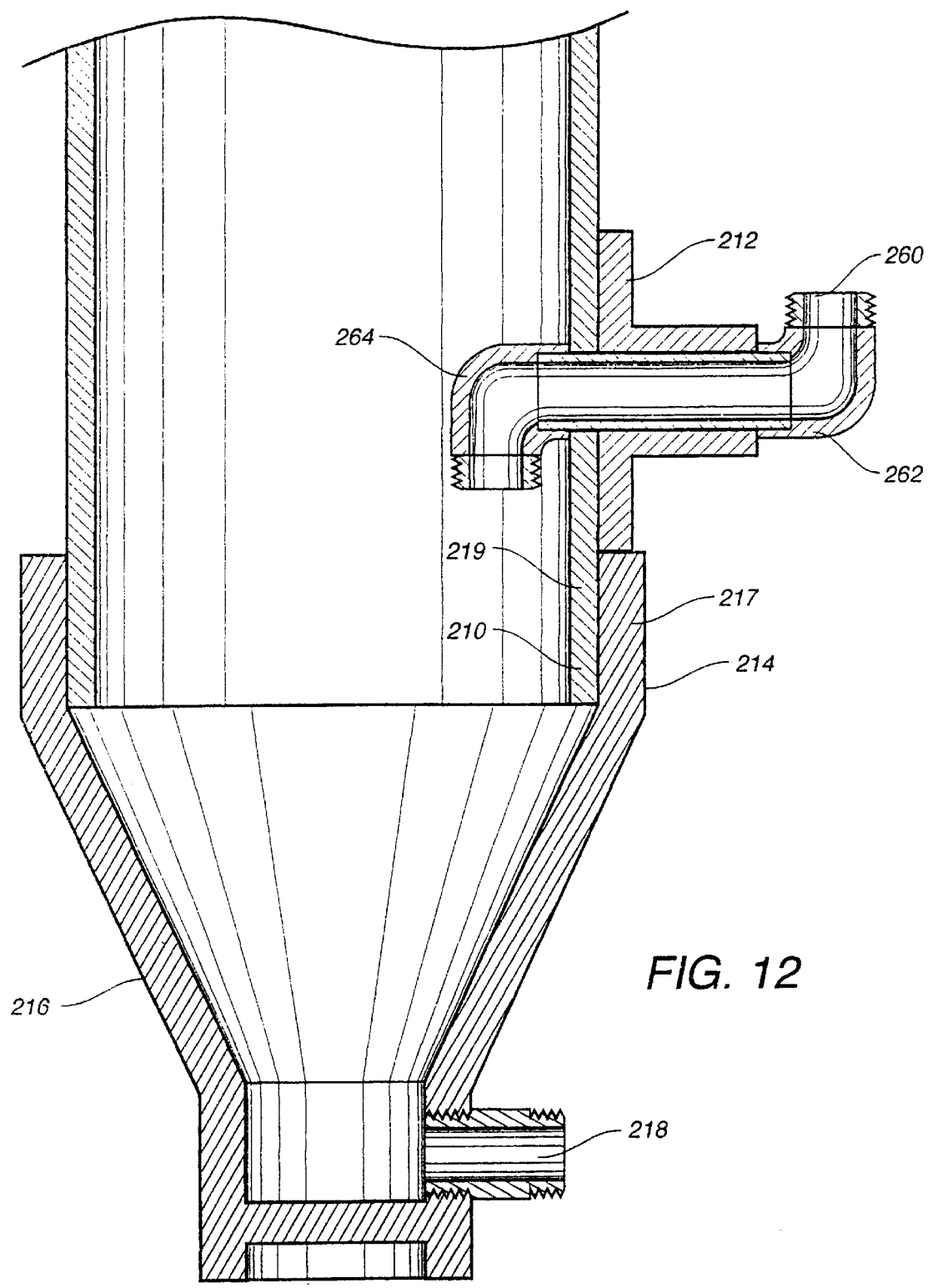
FIG. 12 is a detailed view of the entry chamber of the alternative embodiment of the present invention.

FIG. 12 shows a detailed view of the entry chamber 214. It can be seen that the tapered section 216 extends downwardly to the solids removal outlet 218. Collar 217 secures the entry chamber 214 to the bottom of the treatment chamber 210. In particular, neck 219 extends downwardly into collar 217 so as to assure the proper connection between the entry chamber 214 and the treatment chamber 210.

In FIG. 12, it can be seen that the inlet 212 is connected to a conduit 260 through an elbow 262. Similarly, an internal elbow 264 serves to deliver the effluent water toward the bottom of the entry chamber 214. Since the effluent water is delivered directly downward into the entry chamber 214, the solids and sludges will have an opportunity to settle within the tapered section 216.

Figure 13:
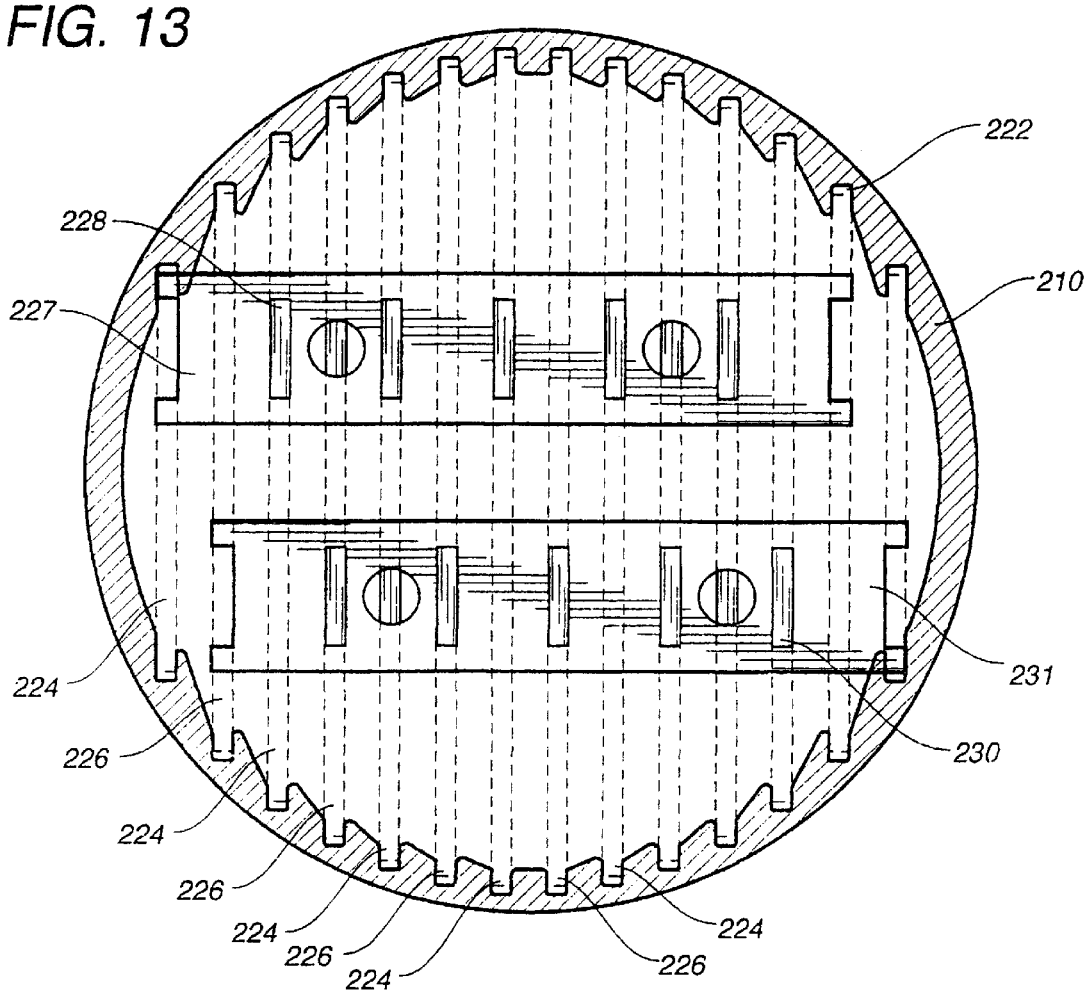
FIG. 13 is a cross-sectional plan view showing the arrangement of electrodes within the interior of the treatment cell of the alternative embodiment of the present invention.

FIG. 13 shows the arrangement of the plate-type electrodes 224 and 226 within the interior of the treatment chamber 210. The treatment chamber includes grooves 222 that are formed into the wall of the cylindrical treatment chamber 210. Each of these grooves 222 forms a slot for the removable receipt of the respective plate-type electrodes 224 and 226. Each of the electrodes 224 and 226 extends, in generally parallel relationship, across the interior of the treatment chamber 210. Each of the electrodes 224 has a projection 228 which extends upwardly therefrom. Each of the electrodes 226 has a projection 230 which extends upwardly therefrom. Each of the projections 228 is connected to a strap 227. Similarly, each of the projections 230 is connected to a strap 231. Straps 227 and 231 are individually connected to positive and negative leads from the power supply.

Figure 14:
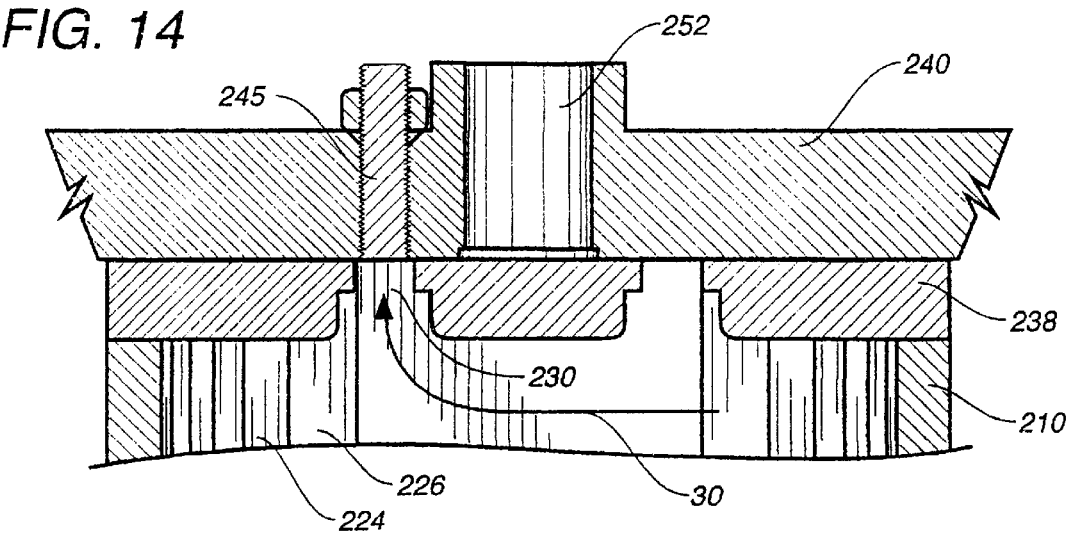
FIG. 14 is a detailed view of the connection of the outlet chamber and the treatment cell of this alternative embodiment of the present invention.

FIG. 14 shows a detailed view in the manner in which flange 240 serves to connect the blending and equalization chamber 238 to the treatment chamber 210. As can be seen, projections 230 are in a proper position for connection to the respective strap. The respective electrodes 226 and 224 extend in generally parallel relation to each other within the interior of the treatment chamber 210. Bolt 245 extends into flange 240 so as to appropriately secure the flange to the connecting flange 243. A pipe 252 extends upwardly through flange 240 so as to allow for the passage of treated effluent from the interior of the treatment chamber 210.

The apparatus and process of the present invention has made application in a number of different fields. For example, and without limitation, the present invention can be applied to various waste streams including primary pigment waste streams, trona mining waste streams, biological waste sludge streams, milk, ice cream and dairy product waste streams, vegetable and fruit industry waste streams, oxidation of water waste streams, refinery, petrochemical, and rubber waste streams, transport tank wash waste streams, metal plating waste streams and metal recovery processing, meat industry waste streams, cooling tower water treatment, and disinfection of water and waste streams.

The present invention is useful for the treatment, stabilization and reduction of contamination of waste streams resulting from processing primary pigments. The primary pigment waste streams include an abundance of metals that produce bright colors normally associated with their use (for example titanium in the production of white paints or chrome for yellow). Most of the resultant sludges are equivalent to enriched metal ores having commercial value which may be used or sold as their own source material. When treating such primary pigment waste streams, the inlet waste water stream is pH adjusted with alkali to optimize treatment (generally between 7 & 9). The waste water is next held in a primary separation vessel to settle out and remove any precipitation which may occur. The waste water is then passed through the treatment cell of iron construction. Electrolysis within the cell produces hydrogen and oxygen radicals. The hydrogen acts as a protonic acid so as to reduce the valance states of the contaminates within the solution, complexing the metal to be removed. The oxygen combines with the dissociated complexes so as to stabilize them. The treatment is instantaneous. The waste water is immediately transferred into the next cell to complete treatment. This cell, of aluminum construction, treats the water in the next phase of treatment to assimilate, precipitate, and remove any remaining compounds within the water stream. Water is held in a separation vessel for 30 to 60 minutes to allow floc formation and facilitate separation and collecting of the sludge by-product from the clean water. The clean water can either be final filtered for reuse or discharged. The collected sludge from the process can be captured and dewatered using a conventional filter mechanism, stabilized, or used as a source material for further recycling.

The process and apparatus of the present invention can be used for the treatment stabilization and reduction of contamination of waste streams resulting from mining of trona. Trona which is the silica used in the manufacture of glass. The inlet waste water stream is pH adjusted with acid to optimize treatment (generally between 7 & 10). The waste water is then passed through the treatment cell using iron. Electrolysis within the cell produces hydrogen (H+) and oxygen ($O_2$). The hydrogen ion acts as an acid dissociating compound and affects the valance states of the sulfur and minerals within the solution, dissolving the carbonates and bicarbonates. The oxygen combines with the dissociated carbon forming carbon dioxide ($CO_2$). The iron ion, which is introduced into the stream, combines with sulphur to form ferric sulfide ($FeS_2$). The treatment is instantaneous. The waste water is immediately transferred into the next cell to complete treatment. A cell, of aluminum construction, treats the water in the next phase of treatment to assimilate, precipitate, and remove any remaining compounds within the water stream. The aluminum ion combines with the silicon, and oxygen to form aluminum silicate ($Al(SiO_3)^3$). Water is held in a separation vessel for 30 to 60 minutes to allow floc formation and facilitate separation and collecting of the sludge by-product from the clean water. The clean water can either be final filtered for reuse or discharged. The collected sludge from the process can be captured and dewatered using a conventional filter mechanism, stabilized and used as a source material for further recycling.

The apparatus and method of the present invention can be used for enhanced dewatering and stabilization of waste sludge streams from activated sludge wastewater treatment plants without the use of polymers while substantially reducing or eliminating harmful coliforms and pathogens. Typical applications include but are not limited to municipal sewer plant waste sludges, septage and its associated sludges, paper and pulp mill waste streams, and landfill leachates. The waste sludge is passed through the treatment cell. As the waste sludge stream enters the energy field within the cell, four separate processes act upon the waste sludge. First, the current being passed through the sludge overcomes the Stern's forces within the organic molecules, disrupting the P-orbits. This process shears the long molecules apart, making them very unstable. Second, electrolysis takes place in the cell, liberating free oxygen and hydrogen within unstable medium. The hydrogen forms a positively charged, nucleophillic radical, which acts like an acid to further break down complex hydrocarbons while the oxygen serves to oxidize the remaining volatile compounds in the sludge. Third, the electrons flowing through the stream catalyze the coagulation or cross-linking of the proteins. Fourth, the cell anodes introduce a charged ion (either cationic or anionic) into the waste stream, both attracting and assimilating the newly formed compounds into a large, stable floc. This combination of processes cause any remaining cellular function within the sludge to cease and desist.

The apparatus and process of the present invention substantially stabilizes and reduces contamination (Primarily $BOD_5$, TSS, COD, and disinfection) of waste streams resulting from the processing of milk, ice cream, and processing of dairy products such as cheese, and their by-products. Because no chemicals are added in the treatment processes, most resultant sludges have commercial value and can be used or sold as its own source material. Typical applications include but are not limited to: milk processing plants, ice cream plants, cheese processing plants, yogurt processing plants. The waste water is passed through the first treatment cell using either iron or titanium as the cell construction to oxidize the volatile organic contaminant while dissociating the emulsion holding the fats, oils, and grease (known as FOG) in solution. A cell with aluminum plates treats the water in the next phase of treatment. The water is held in a three phase separation vessel for 15 to 30 minutes to facilitate separation and collection of the FOG and sludge by-product from the clean water. The clean water can either be final filtered for reuse or discharged. The collected sludge from the separation devices can be captured and dewatered using a conventional filter mechanism. This by-product is available for use as a source material for other food products.

The apparatus and process of the present invention can be used for substantial stabilization and reduction of contamination (primarily $BOD_5$, TSS, COD, and disinfection) and of waste streams resulting from the processing of vegetables, fruits, and their by-products. Because no chemicals are added in the treatment processes, most resultant sludges have commercial value and can be used or sold as their own source material. Typical applications include but are not limited to fruit processing, vegetable processing, juice processing, sugar cane processing; brewery waste processing. The waste water is first treated using a fine screen to remove large solids such as pulp, beggas, and other fibrous materials. Any alcohol, starches, or other hydrophillic compounds within the waste water are then treated one of two ways. They are either detained within an activated sludge treatment tank (either aerobic or anaerobic) to metabolize the simple sugars into more complex, hydrophobic compounds or treated with sodium metabisulfide in a mixing tank for 15 minutes to polymerize the simple proteins into complex hydrophobic compounds. The water is then passed through the treatment cell using either iron or titanium as the cell material to oxidize the volatile organics while dissociating the complex compounds into simple hydrocarbons which are easily treated. A cell with aluminum plates treats the water in the next phase to assimilate, remove, and stabilize the remaining polluting constituents within the water streams. Water enters a vessel to facilitate separation and collecting of the sludge by-product from the clean water. The clean water can either be final filtered for reuse or discharged. The collected sludge from the process can be captured and dewatered using a conventional filter mechanism and used as a source material for further food products.

The process and apparatus of the present invention can be used for the complete and universal oxidation, treatment and disinfection of water and wastewater streams in a single step without the use of chemicals or biological processes. Typical applications include but are not limited to municipal waste water plants, drinking water plants, industrial and chemical waste water plants, food and food processing waste water plants. The water which contains the contaminating material is passed through the treatment cell of titanium construction. Within the treatment cell, a sonic transducer device induces ultrasonic acoustical sound at resonant frequency to induce cavitation in the stream. The cavitation destabilizes the molecular structure of the water (into hydrogen and the hydroxyl radicals). In addition, particulants and surface tension are broken down and greatly reduced. These radicals, along with the hydrogen (which acts as a reducing acid dissociating compound) and oxygen liberated by the electrolysis which occurs, serve to combine with the titanium dioxide (formed from the free oxygen and the titanium ion in the stream) to form titanium dioxide, a powerful catalyst for oxidation. This catalyst assists in reactions with the volatile compounds to completely oxidize them. In addition, surface membranes of the organisms, which are semipermeable membranes that regulate water intake using osmotic forces, are broken apart by the acoustical cavitation and easily oxidized by the oxygen and hydroxyl present. The intense ion exchange from the high amperage catalyzes the coagulation, or cross-linking, of the volatile compounds allowing large scale floc to form. Because the floc Is completely oxidized, it is extremely stable.

The apparatus and method of the present invention provides substantial stabilization and reduction of contamination of waste streams (primarily metals and sulfur) resulting from refining, rubber, chemical and plastic manufacturing. Typical applications include but are not limited to refinery processing, plastic and petrochemical processing, rubber processing and rubber product manufacturing.

The waste water is pH adjusted to optimize removal of the target metals (vanadium requires a pH of 9, while nickel requires a pH of 6) but, generally the resultant pH is between 4 and 10. The waste water is then passed through the treatment cell using either iron or titanium, reducing the valance states of the metals within the solution, allowing the metals to complex, forming new compounds and oxidizing the volatile complex hydrocarbon compounds while dissociating the emulsion holding the residual oils and grease (known as TPH) in solution. The water is held in a separation vessel for 15 to 30 minutes to allow the hydrocarbons to separate from the water and be collected and removed. The metal treatment is instantaneous while the collection of the oils and grease is not. The waste water is therefore transferred into an intermediate separation tank for 30 minutes to allow for the collection and removal of the oils and grease. A cell, of aluminum construction, treats the water in the next phase of treatment to assimilate, precipitate, and remove the new metal compounds within the water streams. Water is held for 15 to 30 minutes in a separation vessel to allow floc formation and facilitate collecting of the sludge by-product from the clean water. The clean water can either be final filtered for reuse or discharged. The collected sludge from the process can be captured and dewatered using a conventional filter mechanism and used as a source material for further metal extraction and recycling or prepared for disposal.

The process and apparatus of the present invention provides substantial treatment, stabilization and reduction of contamination of waste streams resulting from container wash out, primarily in the transport industry. Wash out waste water can be anything which is transported in a container or tank. The ability of the electrocoagulation process to effect universal treatment for the wide variety of contaminants found in this application is unique. The typical applications include but are not limited to trucks, rail cars, barges, tanker ships, storage tanks. Wash out waste water is not contaminant specific. The inlet waste water is passed through a screening mechanism to remove large particulate matter. The waste water is then pH adjusted (generally between 4 and 9) to optimize treatment. The waste water is then passed through the treatment cell using either lead, iron, or titanium, reducing the valance states of the metals within the solution, allowing the metals to complex, forming new compounds and oxidizing the volatile complex hydrocarbon compounds while dissociating the emulsion holding the residual fats, oils and greases (known as FOG) in solution. Biological, organic, or food residuals are treated by destabilizing the Stern's forces affecting the P-orbits while creating an osmotic imbalance, destroying existing micro- organisms. The water is held in a separation vessel for 15 to 30 minutes to allow the FOG to separate from the water and be collected and removed. The metal treatment is instantaneous while the collection of the oils and grease is not. The waste water is therefore transferred Into an intermediate separation tank for 30 minutes to allow for the collection and removal of the oils and grease. Solvents may exhibit some destruction and stripping of chlorine, sulfur, or phosphorous. Often solvents are driven off as vapors and may be collected for further processing or disposal. A cell, of aluminum construction, treats the water in the next phase of treatment to assimilate, precipitate, and remove any remaining compounds within the water stream. Water is held in a separation for 30 to 60 minutes vessel to allow floc formation and facilitate separation and collecting of the sludge by-product from the clean water. The clean water can either be final filtered for reuse or discharged. The collected sludge from the process can be captured and dewatered using a conventional filter mechanism and used as a source material for further recycling or prepared for disposal.

The apparatus and method of the present invention provides substantial stabilization and reduction of metal contamination of waste streams resulting from the metal plating, galvanizing, and etching of circuit boards and manufacture of their associated electronic components. Most resultant sludges are equivalent to enriched metal ores having commercial value which can be used or sold as their own source material. Typical applications include but are not limited to metal plating, photo processing laboratories, metal finishing and processing, galvanizers, and electronics manufacturing. The waste water is pH adjusted to optimize removal of the target metals (chrome requires a pH of 9, while arsenic requires a pH of 4) but, generally the resultant pH is between 4 and 10. The waste water is then passed through the treatment call using either iron or titanium, reducing the valance states of the metals within the solution, allowing the metals to complex, forming new compounds. The treatment is instantaneous and the waste water is transferred immediately into the next cell. A cell, of aluminum construction, treats the water in the next phase of treatment to assimilate, precipitate and remove the new metal compounds within the water stream. Water is held 15 to 30 minutes in a separation vessel to allow floc formation and facilitate separation and collecting of the sludge by-product from the clean water. The clean water can either be final filtered for reuse or discharged. The collected sludge from the process can be captured and dewatered using a conventional filter mechanism and used as a source material for further metal extraction and recycling or treated for disposal. Often the sludge produced by the electrocoagulation process is so stable that the material will pass the TCLP test without further treatment.

The method and apparatus of the present invention provides substantial stabilization and reduction of contamination (primarily $BOD_5$, TSS, COD, and disinfection) of waste streams resulting from the slaughter and processing of meats and their by-products. Because no chemicals are added in the treatment processes, most resultant sludges have commercial value and can be used or sold as their own source material. Typical applications include but are not limited to beef slaughter and processing, pork slaughter and processing, poultry slaughter and processing, fish processing, tannery processing. The waste water is fine treated using a fine screen to remove large solids such as paunch manure, blood clots, hair and feathers. The waste water is then passed through the treatment call using either iron or titanium as the cell material to oxidize the volatile organics while dissociating the emulsion holding the fats, oils, and grease (known as FOG) in solution. The water is held in a separation vessel for 15 to 30 minutes to allow the FOG to separate from the water and be collected and removed. A cell with aluminum plates treats the water in the next phase of treatment to assimilate, remove, and stabilize the remaining polluting constituents within the water stream. Water enters a second vessel to facilitate separation and collecting of the sludge by-product from the clean water. The clean water can either be final filtered for reuse or discharged. Except for the tannery waste, where chrome is present in the water, the collected sludge from the process can be captured and dewatered using a conventional filter mechanism and used as a source material for further food products.

The process and apparatus of the present invention provides conditioning of recirculating water used within cooling towers to eliminate scale and algae buildup without the use of harmful chemicals, such as chlorine, for elimination of algae or polymers and water treatment chemicals for elimination of scale (carbonate buildup), substantially reducing or eliminating periodic water blow down or discharge. Typical applications include but are not limited to big cooling towers and little cooling towers. The cooling water is passed through the treatment cell. The preferred material of construction is copper. As the water stream enters the energy field within the cell, the carbonates and minerals within the water stream are systematically broken down into their elemental components by the liberated hydrogen, a proton which forms a nucleophililc radical and acts as an acid. The resultant elements then reform with the liberated oxygen to form carbon dioxide. The copper ion introduced into the waste stream is particularly toxic to Invertebrate life forms offering a residual in the waste stream to eliminate future growth in the cooling tower system. The remaining elements within the water stream coalesce around the charged ions (from the copper metallurgy used) being introduced via the flux field generated by the high current flow which both attracts and complexes the newly formed compounds into a matrix of a large stable floc. This floc can be captured using a conventional filter mechanism. Any algae, molds, or bacteria are simultaneously destroyed as previously described.

The present invention provides the elimination of unwanted biological organisms in water and wastewater streams without the use of hazardous chemicals. Typical applications include but are not limited to sewer plant discharges, drinking water disinfection, control of snail populations in various treatment processes, control of zebra mussels in water intakes for power plants, boilers and other raw water intakes, hospital and laboratory waste water and swimming pools. The water which contains the infectious or pathogenic organisms is passed through the treatment cell. The surface membranes of the organisms are semi-permeable membranes which regulate water intake using osmotic forces. The control of this osmotic cellular water balance is within the electrical charge of the fats and proteins in the organism surface membrane. The intense ion exchange and high amperage occurring within the treatment cell drives these surface membranes to an imbalanced state by overwhelming the organisms electrical field and charge; depending upon the surface membrane polarization (+or −), the organism is either excessively hydrated (and blows up like a balloon) or, is dehydrated (and shrivels up like a prune). Alternatively, the electron catalyzes the coagulation, or cross-linking of the proteins causing the cellular function to cease and desist. Different materials of cell construction (such as copper or carbon) can be used to increase or limit residual disinfection properties after the water stream exits the treatment process to achieve the desired results.

Persons in the art will understand that while certain forms of the present invention have been described and illustrated, the invention should not be limited to the specific forms or arrangement of parts described and shown. Numerous aspects of the treatment cell and process which have been described and illustrated are intended to be exemplary and the exemplary particulars are not intended to limit the range of design and use.

What is claimed is:

1. An apparatus for treatment of effluent water comprising:

a chamber having an inlet means and an outlet means;

a plurality of plate-shaped electrodes extending in said chamber, said plurality of plate-shaped electrodes defining a plurality of channels extending within said chamber, each of said plurality of channels occurring between adjacent electrodes of said plurality of plate-shaped electrodes, said plurality of plate-shaped electrodes positioned between said inlet means and said outlet means, each of said first set of said plurality of plate-shaped electrodes comprising a flat plate of conductive material extending vertically within said chamber, each of said second set of said plurality of plate-shaped electrodes comprising a corrugated plate of conductive material extending vertically within said chamber; and electrical means connected to each of said plurality of plate-shaped electrodes, said electrical means for delivering electricity of a first polarity to a first set of said plurality of plate-shaped electrodes, said electrical means for delivering electricity of an opposite polarity to a second set of said plate-shaped electrodes, said first set being in alternating relationship with said second set such that an electrode of said first set extends between adjacent electrodes of said second set and such that an electrode of said second set extends between adjacent electrodes of said first set, said inlet means for delivering effluent to said plurality of channels, said outlet means for passing treated effluent from said plurality of channels.

2. The apparatus of claim 1, said chamber comprising:

an entry chamber having an inlet means affixed thereto;

a treatment section positioned above said entry chamber in fluid communication therewith, said plurality of plate-shaped electrodes extending generally vertically in said treatment section; and an outlet chamber positioned above said treatment section in fluid communication therewith, said outlet means being connected to said outlet chamber.

3. The apparatus of claim 2, said entry chamber having a solid outlet means formed thereon, said solid outlet means positioned below said inlet means, said solid outlet means for removal of sludges and solids from said entry chamber.

4. The apparatus of claim 3, said entry chamber having a downwardly tapered section extending below said inlet means, said solid outlet means positioned at a bottom of said tapered section.

5. The apparatus of claim 2, said outlet chamber comprising a gas release means positioned thereon, said gas release means for passing a gas from an interior of said outlet chamber.

6. The apparatus of claim 1, each of said second set of said plurality of plate-shaped electrodes comprising a corrugated plate of conductive material extending vertically within said chamber.

7. The apparatus of claim 1, said electrical means comprising:

a power supply having a first lead connected to said first set and a second lead connected to said second set.

8. The apparatus of claim 1, further comprising:

polarity reversal means connected to said first and second leads for periodically reversing the polarity of electricity passing through said first set and said second set.

9. The apparatus of claim 1, each of said first set of said plurality of plate-shaped electrodes being connected to another of said first set by a first conductive strap, each of said second set of said plurality of plate-shaped electrodes being connected to another of said second set by a second conductive strap, said first lead electrically connected to said first strap, said second lead electrically connected to said second set.

10. The apparatus of claim 1, said electrical means for passing electricity of constant amperage to said plurality of plate-shaped electrodes.

11. The apparatus of claim 1, said inlet means comprising:

an entry hole formed at a lower end of said chamber;

a conduit connected to said entry hole; and a pump means connected to said conduit for passing effluent at a constant flow rate to said entry hole.

12. The apparatus of claim 1, said outlet means comprising:

an outlet hole formed at an upper end of said chamber;

a conduit connected to said outlet hole for passing treated effluent from said chamber; and a coalescence tank connected to said conduit.

13. A method of treating an effluent comprising the steps of:

forming a first set of plate-shaped electrodes, each of said first set being a flat plate of conductive material; and forming a second set of plate-shaped electrodes, each of said second set being a corrugated plate of conductive material, each plate-shaped electrodes of said second set being sandwiched between adjacent pairs of plate-shaped electrodes of said first set;

passing an effluent between said first set of plate-shaped electrodes and said second set of plate-shaped electrodes;

applying electricity of a first polarity to said first set of plate-shaped electrodes and of an opposite polarity to said second plate-shaped electrodes as the effluent passes therebetween said step of applying electricity comprising:

applying direct-current electricity of an amperage of between 20 and 60 amps and a voltage of between 5 and 30 volts, said amperage being constantly applied; and reversing the polarities to said first and second sets of plate-shaped electrodes periodically as the effluent passes therebetween; and moving the effluent from the electrodes to a coalescence tank.

14. The method of claim 13, further comprising the steps of:

coalescing the effluent in the coalescence tank so as to form a discrete layer of immiscible liquid in said tank; and separating the discrete layer from the effluent.

15. The method of claim 13, further comprising the step of:

pumping the effluent at a constant flow rate of between 20 to 30 gallons per minute into a vertical chamber containing the first plate-shaped electrode and the second plate-shaped electrode, said effluent having a pH of between 4 and 9 and a temperature of between 40° F. and 180° F.

16. The method of claim 13, further comprising the steps of:

forming a chamber having an inlet adjacent a lower end and an outlet adjacent an upper end of said chamber, said chamber extending vertically;

positioning said first plate-shaped electrode and said second plate-shaped electrode between said inlet and said outlet in said chamber; and passing the effluent vertically upwardly within said chamber such that the effluent passes between said first and second plate-shaped electrodes.

* * * * *